United States Patent [19]

Beicht et al.

[11] Patent Number: 4,901,702
[45] Date of Patent: Feb. 20, 1990

[54] APPARATUS FOR THE MEASURED FEEDING OF VOLATILE FUEL COMPONENTS TO THE INTAKE TUBE OF AN INTERNAL COMBUSTION ENGINE

[75] Inventors: Bernd Beicht, Gross-Umstadt; Reinhard Tinz, Gross-Bieberau; Joachim Heinemann, Weinheim, all of Fed. Rep. of Germany

[73] Assignee: Firma Carl Freudenberg, Weinheim/Bergstrasse, Fed. Rep. of Germany

[21] Appl. No.: 300,431

[22] Filed: Jan. 23, 1989

[30] Foreign Application Priority Data

Jan. 29, 1988 [DE] Fed. Rep. of Germany ....... 3802664

[51] Int. Cl.$^4$ ............................................. F02M 39/00
[52] U.S. Cl. .................................... 123/520; 123/463; 123/458
[58] Field of Search ............... 123/520, 519, 518, 516, 123/521, 463, 458

[56] References Cited

U.S. PATENT DOCUMENTS

| | | | |
|---|---|---|---|
| 4,270,504 | 6/1981 | Sciotti | 123/519 |
| 4,308,842 | 1/1982 | Watanabe | 123/519 |
| 4,446,838 | 5/1984 | Suzuki | 123/519 |
| 4,448,734 | 5/1984 | Shibano | 123/519 |
| 4,628,887 | 12/1986 | Mitchell | 123/520 |
| 4,630,581 | 12/1986 | Shibata | 123/519 |
| 4,658,797 | 4/1987 | Brand | 123/516 |
| 4,809,667 | 3/1989 | Uranishi | 123/518 |

FOREIGN PATENT DOCUMENTS

| | | | |
|---|---|---|---|
| 3519292 | 4/1986 | Fed. Rep. of Germany | 123/520 |
| 56-77545 | 6/1981 | Japan | 123/519 |
| 56-154154 | 11/1981 | Japan | 123/519 |
| 58-110853 | 7/1983 | Japan | 123/519 |
| 60-175757 | 9/1985 | Japan | 123/519 |
| 63-297757 | 12/1988 | Japan | 123/519 |
| 64-3258 | 1/1989 | Japan | 123/519 |

Primary Examiner—Carl Stuart Miller
Attorney, Agent, or Firm—Karl F. Milde, Jr.

[57] ABSTRACT

An apparatus for the temporary storage and controlled feeding of the volatile fuel components situated in the free space of a tank to the intake tube of an internal combustion engine. The apparatus includes a vent line connecting the free space to the atmosphere. In the vent line there is disposed a storage chamber containing an absorption element, as well as a line connecting the storage chamber to the intake tube, which can be shut off by an electromagnetic check valve. Between the check valve and the intake tube there is disposed an auxiliary valve with a control chamber. The auxiliary valve can be closed by a vacuum actuator in dependence upon the pressure difference between the control chamber and the atmosphere.

10 Claims, 2 Drawing Sheets

APPARATUS FOR THE MEASURED FEEDING OF VOLATILE FUEL COMPONENTS TO THE INTAKE TUBE OF AN INTERNAL COMBUSTION ENGINE

BACKGROUND OF THE INVENTION

The invention relates to apparatus for the temporary storage and measured feeding of the volatile fuel components in the free space of a fuel tank system into the intake tube of an internal combustion engine. The apparatus includes a vent line connecting the free space to the atmosphere. In this vent line there is disposed a storage chamber with an absorption element, as well as a line which connects the storage chamber to the intake tube. This line can be shut by an electromagnetic check valve which has a control chamber of enlarged cross section between the check valve and the intake tube as well as an auxiliary means disposed in the control chamber for varying the opening of the check valve.

Apparatus of this type is disclosed in the German patent publication No. 35 19 292. This apparatus prevents the escape into the atmosphere of the volatile fuel components always present in the free space of the fuel tank of an internal combustion engine, and makes use of a special vent line disposed between the free space and the atmosphere which incorporates a storage chamber with an absorption element. This absorbtion element usually consists of a permeable body of active carbon that is capable of momentarily storing a considerable volume of volatile fuel. To regenerate the absorption element, fresh air is aspirated through the internal combustion engine during its normal operation, making use of a line which connects the storage chamber to the intake tube of the engine. It is to be noted, however, that at low engine running speeds and/or in the case of an especially high degree of saturation of the absorption element, the fuel-air mixture aspirated by the internal combustion engine can become "over-rich" resulting in disturbances in engine operation. The line can therefore be shut by an electromagnetic check valve through which the flow is variably controlled by means of external sensors, on the one hand, and by the vacuum in the line acting on its valve body, on the other hand.

SUMMARY OF THE INVENTION

It is an object of the present invention to improve apparatus of the type described above so as to assure both an optimum regeneration of the absorption element and optimum performance of the internal combustion engine.

This object, as well as other objects which will become apparent from the discussion that follows, are achieved, according to the present invention, by inserting an auxiliary valve directly in series ahead of the check valve, the auxiliary valve being closable by a vacuum actuator that is operated by the difference in pressure between the control chamber and the atmosphere. When the internal combustion engine operates at low speed there is produced a relatively great difference in pressure. As a result, the bias pressure of the check valve is lowered and the flow through the valve is reduced. Any over-richness of the fuel-air mixture fed to the internal combustion engine is thereby reliably prevented.

On the other hand, when the internal combustion engine is operated at high speed, the difference in pressure at the vacuum actuator will be less and, as a result, the bias at the check valve will be relatively increased. The total flow through the valve is accordingly also increased and, therefore, the internal combustion engine will be fed a correspondingly increased proportion of fresh air, which will flow through the absorption element, thus becoming enriched with the fuel components. The good performance of the internal combustion engine will not be impaired by this.

The preferred embodiment of the present invention will now be described with the aid of the accompanying drawing.

DESCRIPTION OF THE PREFERRED EMBODIMENT

Figure 1:
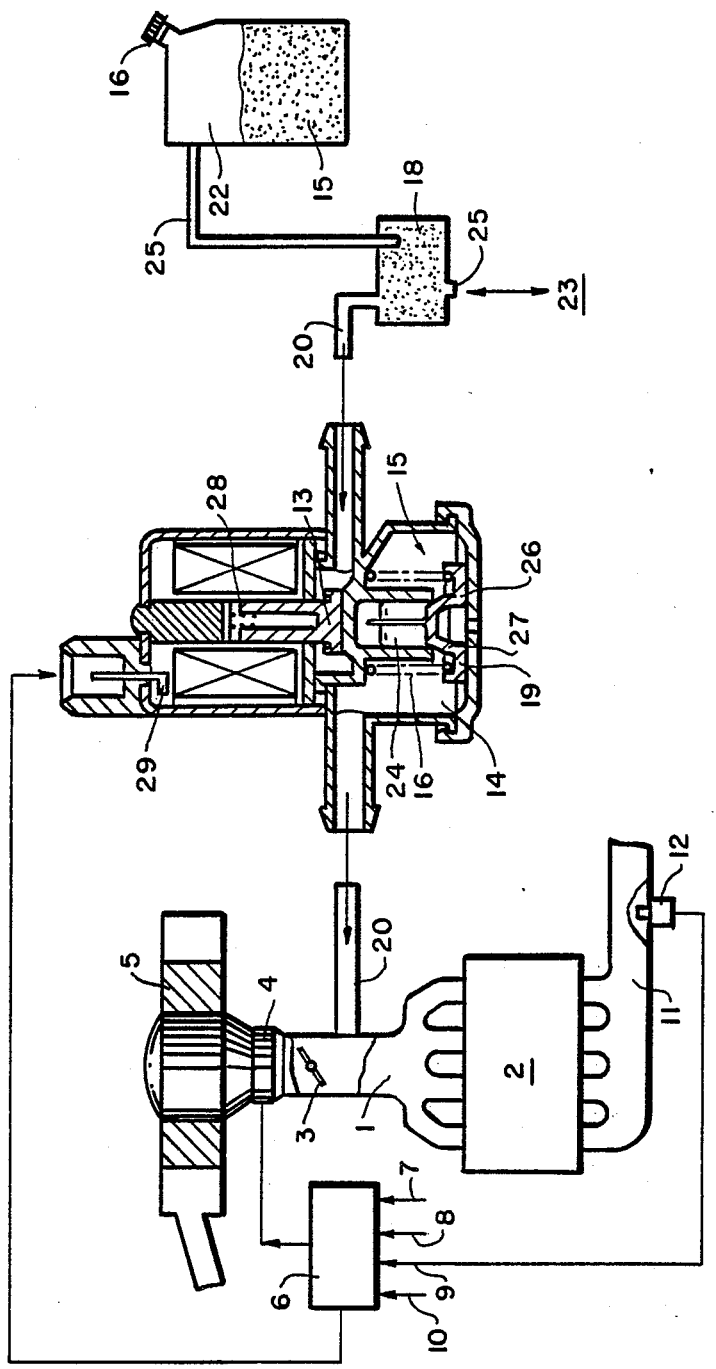
FIG. 1 is a partially diagrammatic representation of the preferred embodiment of the invention.
Figure 2:
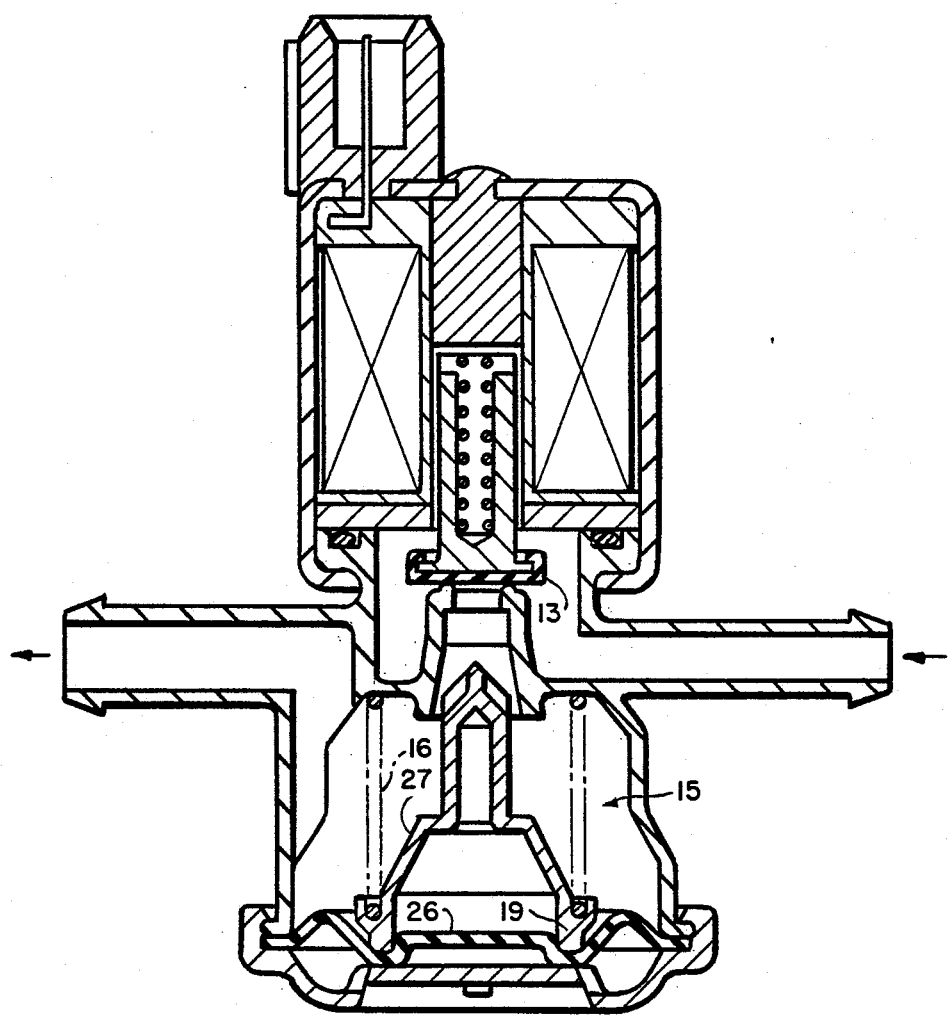
FIG. 2 is a partial section of FIG. 1.

The internal combustion engine represented in the left side of the Figure is identified by 2 and is connected by an intake tube 1 containing a throttle valve 3 to an air filter 5 and by an exhaust manifold 11 to an exhaust pipe (not shown).

In the intake tube 1 above the throttle valve 3 is the fuel mixing device 4 in which fresh air passing through the air filter 5 is mixed with the requisite amount of fuel. The signals required for this purpose are processed by the control unit 6, for example on the basis of the exhaust temperature and composition, the operating speed of the internal combustion engine and the ambient temperature. The corresponding input signals which are derived from appropriate sensors are indicated by the arrows 7, 8, 9 and 10. More such sensors can be provided as needed.

On the right side of the Figure is shown a fuel tank. It is only partly filled with fuel 15 and has a free space 22 above the fuel level. The cap 16 of the fuel tank seals it off from the surrounding atmosphere.

The free space 22 in the fuel tank is connected to the atmosphere 23 through a vent line 25. The vent line 25 contains a storage chamber 18 which is filled with granulated active carbon. The dimensions of the storage chamber 18 are such that under normal operating conditions volatile fuel components cannot pass through the mouth of the vent line 25.

A line 20 is connected to the side of the storage chamber 18 situated opposite the mouth of the vent line 25. This line 20 connects the storage chamber to the intake tube 1 of the internal combustion engine. An electromagnetic check valve 13, disposed in the line 20, is closed when the internal combustion engine is turned off and can be operated by the control apparatus 6.

Between the check valve 13 and the intake tube 1 is an auxiliary valve 15. When the internal combustion engine is shut off, this valve is opened by the action of a compression spring 16 that is located in a control chamber 14 and engages one side of a flange 19 of a corresponding valve body 27. The other side of the flange 19 rests against the control chamber-facing side of a diaphragm 26 that separates the control chamber 14 from the atmosphere 23. The operation of this device is as follows:

During the normal operation of the internal combustion engine the check valve 13 is statically open and the volume of air aspirated through the storage chamber 18 is controlled by the auxiliary valve 15, the auxiliary valve 15 being displaced on the basis of the difference between the pressure in the intake tube 1 and the pressure in the line 20 as well as the atmosphere 23. As the difference in pressure increases, the rate of flow of the fuel first increases until a stop point is reached which is determined mostly by the design of the compression spring 16 and the working diaphragm 26. If the difference increases further, the auxiliary valve 15 closes the produces a reduction in the rate of flow of the fuel vapors in the idling and driving operation of the internal combustion engine.

For the purpose of further improving the clearing of the storage chamber 18 it is possible, in addition to what has been explained above, to operate the auxiliary valve cyclically. The air volume actually passed through the line 20 can thus be sensitively adapted to the particular requirements, and especially to the momentary state of operation of the internal combustion engine 2. When the engine is shut off, the check valve 13 is closed by the resultant loss of voltage to its electrical coil and by the action of the spring 28, thus reliably suppressing any run-on of the internal combustion engine even if vacuum is still temporarily present in the intake tube 1. Likewise, if the operation of the check valve 13 is interrupted by the action of the spring, the unmetered introduction of fuel vapors into the intake tube 1 is prevented.

There has thus been shown and described a novel apparatus for the measured feeding of volatile fuel components to the intake tube of an internal combustion engine which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention which is limited only by the claims which follow.

What is claimed is:

1. In apparatus for the temporary storage and measured feeding of the volatile fuel components in the free space of a tank system into the intake tube of an internal combustion engine, including a vent line connecting the free space to the atmosphere, in which vent line there is disposed a storage chamber with an absorption element, as well as a line which connects the storage chamber to the intake tube and can be shut by an electromagnetic check valve having a control chamber of expanded cross section relative to said line between the check valve and the intake tube as well as an auxiliary means disposed in the control chamber for varying the opening of the check valve, the improvement wherein the auxiliary means comprises an auxiliary valve situated between the check valve and the intake tube, and wherein the auxiliary valve is closable by a vacuum actuator in response to the pressure difference between the control chamber and the atmosphere.

2. The apparatus according to claim 1, wherein the vacuum actuator acts against the force of a spring.

3. The apparatus according to claim 2, wherein the spring is a compression spring and is disposed in the control chamber.

4. The apparatus according to claim 1, wherein the vacuum actuator comprises an actuating diaphragm disposed between the atmosphere and the control chamber.

5. The apparatus according to claim 3, wherein the auxiliary valve has a separate valve body, wherein the valve body is provided with a supporting flange and wherein the supporting flange is engaged on one side with the actuating diaphragm and on the other side with the compression spring.

6. The apparatus according to claim 5, wherein the auxiliary valve is includes a passage opening parallel to the direction of movement of the valve body and wherein the valve body has a prolongation which is guided in the opening.

7. The apparatus according to claim 6, wherein the valve body and the opening are of a conical configuration in the area of the sealing surfaces of the auxiliary valve.

8. The apparatus according to claim 1, wherein the check valve is provided with electrically operated drive means.

9. The apparatus according to claim 8, wherein said drive means act against the force of a spring to open the check valve.

10. The apparatus according to claim 8, wherein said drive means are provided with electrical connections which are situated outside of the fuel-contacting parts of the check valve.

* * * * *